(12) United States Patent
Oosawa

(10) Patent No.: US 6,717,697 B1
(45) Date of Patent: Apr. 6, 2004

(54) IMAGE-COMPONENT RENDERING METHOD AND RECORDING MEDIUM IN WHICH IMAGE-COMPONENT RENDERING PROGRAM IS RECORDED

(75) Inventor: Akira Oosawa, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/345,781

(22) Filed: Jul. 1, 1999

(30) Foreign Application Priority Data

Jul. 2, 1998 (JP) .............................. 10-187866

(51) Int. Cl.[7] .............................................. G06K 9/48
(52) U.S. Cl. ....................................... 358/1.9; 382/199
(58) Field of Search ....................... 358/1.9, 1.16–1.17; 382/266, 199

(56) References Cited

U.S. PATENT DOCUMENTS

| | | | | |
|---|---|---|---|---|
| 4,685,068 A | * | 8/1987 | Greco et al. ................. | 382/157 |
| 4,868,884 A | * | 9/1989 | Miyazaki et al. ............ | 382/283 |
| 5,617,487 A | * | 4/1997 | Yoneyama et al. ......... | 382/199 |
| 5,872,864 A | * | 2/1999 | Imade et al. ................ | 382/176 |
| 6,151,408 A | * | 11/2000 | Oosawa ....................... | 382/164 |

FOREIGN PATENT DOCUMENTS

| | | | | |
|---|---|---|---|---|
| JP | 61-274473 | 12/1986 | | |
| JP | 2-4549 | 1/1990 | | |
| JP | 8-221567 | 8/1996 | ............. | G06T/7/00 |
| JP | 08221567 A | * 8/1996 | ............. | G06T/7/00 |
| JP | 9-161078 | 6/1997 | | |

\* cited by examiner

Primary Examiner—Thomas D. Lee
Assistant Examiner—Stephen Brinich
(74) Attorney, Agent, or Firm—Sughrue Mion, PLLC

(57) ABSTRACT

An image-component rendering method includes a step of generating discontinuity information of an original image representing discontinuity of color information expressed by a line process, on the basis of the color information of the original image; a step of extracting a contour of an object image included in the original image on the basis of the generated discontinuity information, and separating the object image by using the extracted contour; and a step of determining outline information in which the contour of the object image is outlined on the basis of the discontinuity information with respect to the separated object image, and encoding color information of the object image. Accordingly, an object image can be formed into a component by describing the object image by the contour of the outlined object image and by the color information of the object image.

15 Claims, 8 Drawing Sheets

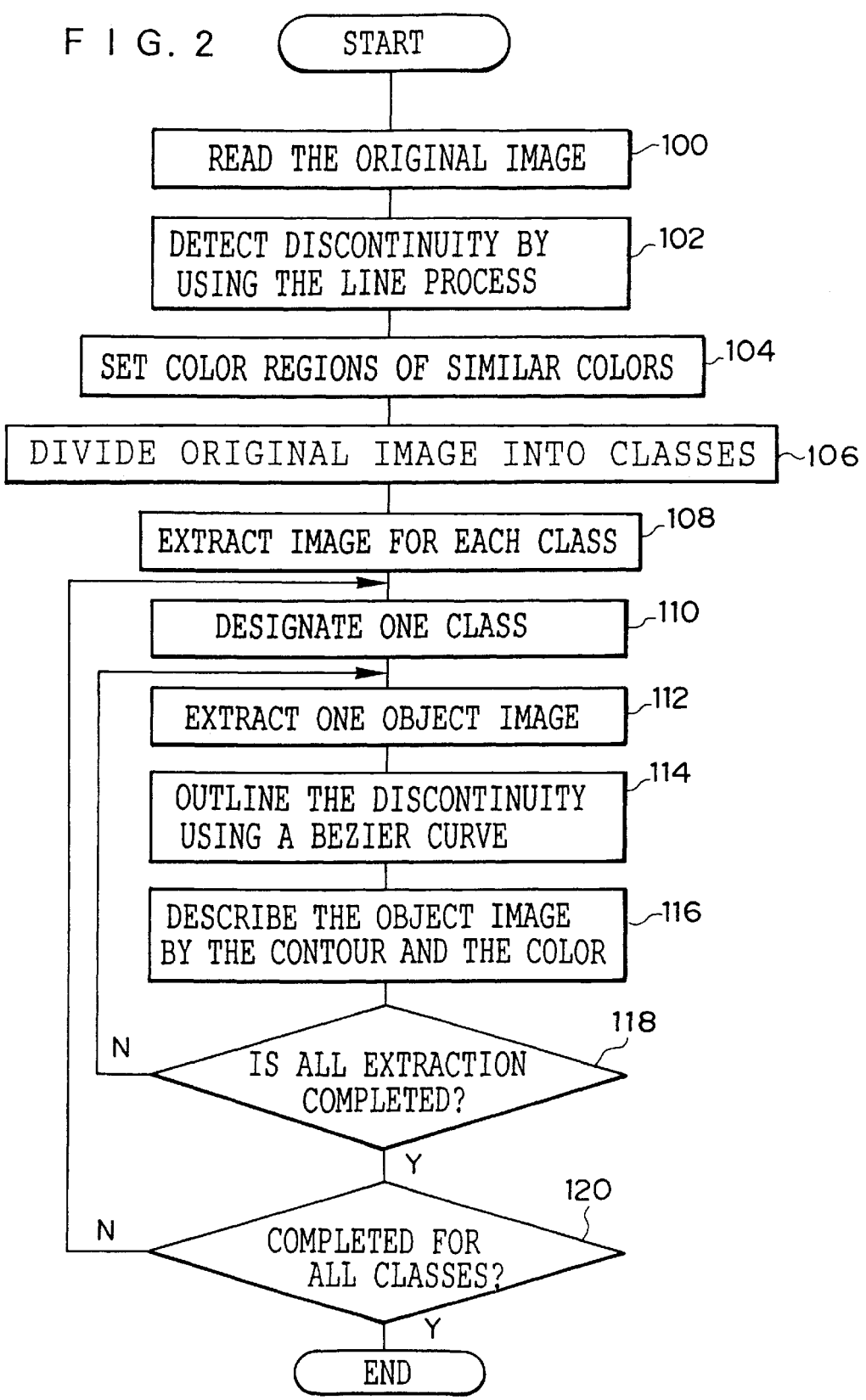

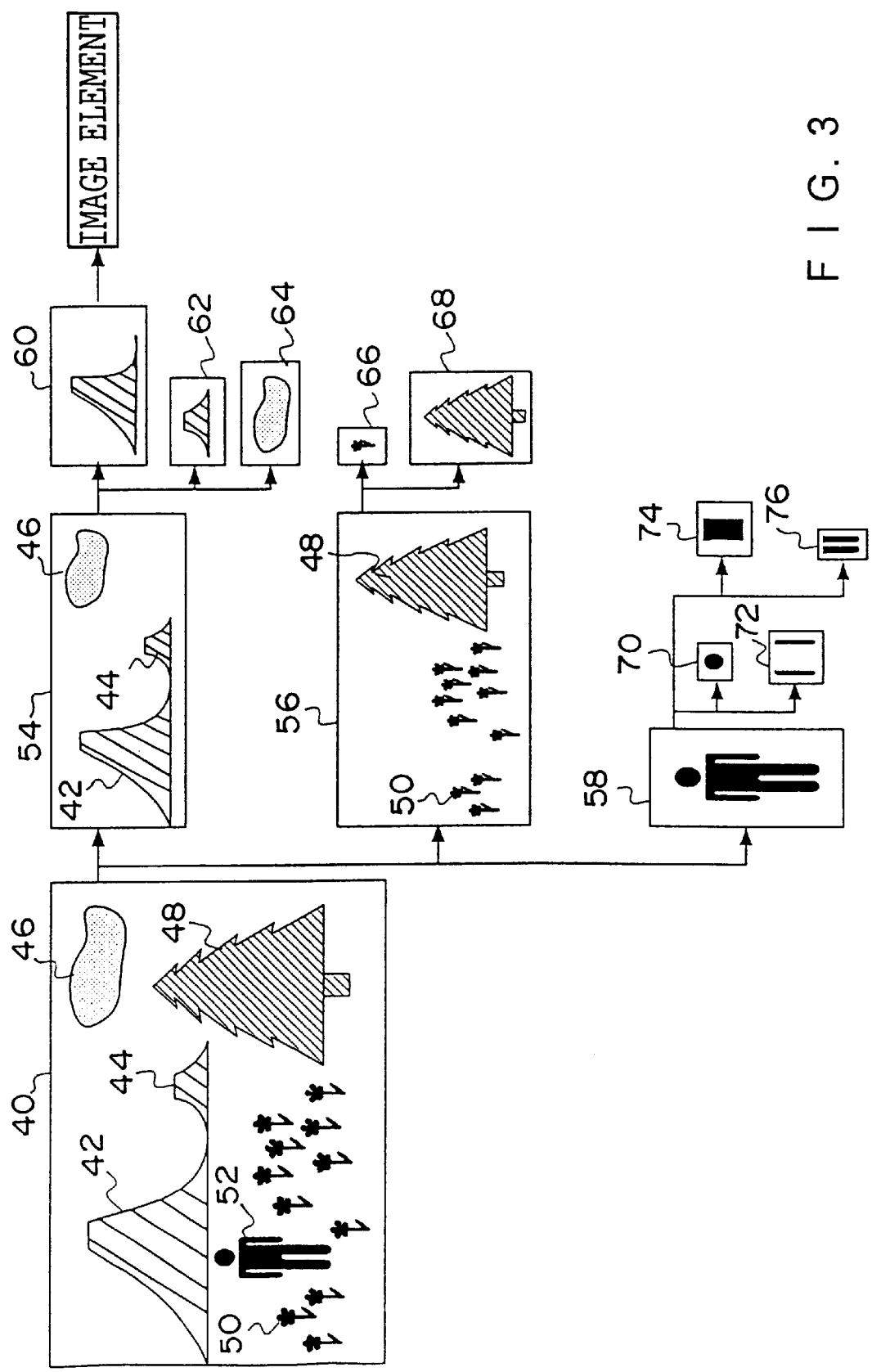

FIG. 6A
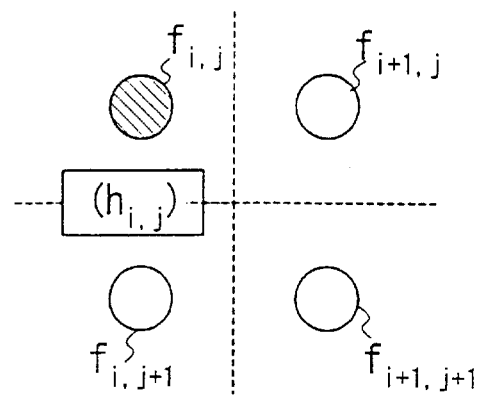
FIG. 6B
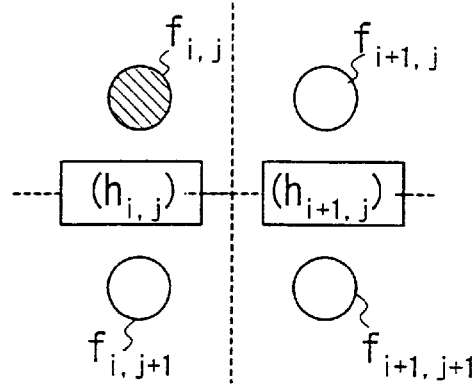
FIG. 6C
FIG. 6D
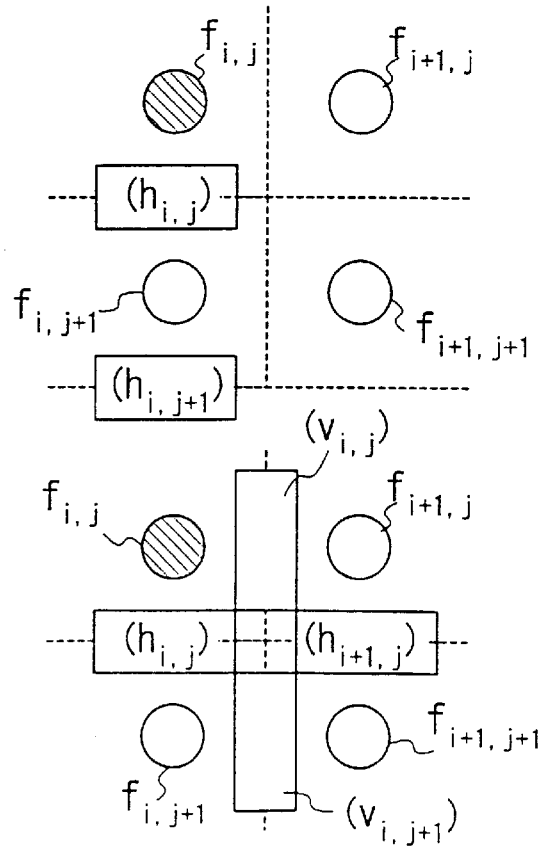

IMAGE-COMPONENT RENDERING METHOD AND RECORDING MEDIUM IN WHICH IMAGE-COMPONENT RENDERING PROGRAM IS RECORDED

BACKGROUND OF THE INVENTION

1. Field of the Invention

The present invention relates to an image-component rendering method and a recording medium in which an image-component rendering program is recorded, and more particularly to an image-component rendering method for rendering from an original image an object image representing an object included in the original image into a component as well as a recording medium in which an image-component rendering program is recorded.

2. Description of the Related Art

In recent years, in conjunction with progress made in computer technology, there are cases where color images are digitized as image data, and the image data is stored or circulated so as to be made use of. This digitized image data includes, among others, image data representing photographed images which are generated by being photographed by a digital photographing apparatus such as a digital camera, or image data representing scanned images which are generated by scanning color originals by a scanner.

Since the aforementioned image data is easy to process, there is a demand for reusing partial images (hereafter referred to as object images) which represent scenes and objects, such as mountains and persons, which are included in original images. To reuse the object images, the object images must be extracted from the original images. In this extraction, a region including the object image can be extracted by clipping out an original image in a shape designated in advance or by clipping out a fixed area from the original image by using commercially available application software, but there are cases where a non-object image other than the required object image is included.

For this reason, many techniques have been proposed for extracting a predetermined region from an original image. For example, the present assignee has proposed a technique for separating a desired color region from an original image (Japanese Patent Application Laid-Open (JP-A) No. 8-221567).

However, the object image is a desired color image, and the object image which is obtained by separating the desired color region from the original image is limited at the time of reuse. Namely, when the object image is reused, there are cases where the object image is enlarged or reduced. In this case, there are cases where a change in the resolution of the object image is required, and an object image which conforms to that resolution is required. For instance, rephotographing is required in the case of the photographed image, and rescanning is required in the case of the scanned image. Accordingly, even if the desired color region is separated, it is merely an image of a clipped out region, and there is a limit to the reuse threrof. For this reason, there is a need to render object images into components for the purpose of reuse.

SUMMARY OF THE INVENTION

In view of the above-described circumstances, it is an object of the present invention to provide an image-component rendering method for rendering an object image included in an original image into a component which can be easily reused, as well as a recording medium in which an image-component rendering program is recorded.

To this end, in accordance with a first aspect of the present invention, there is provided an image-component rendering method comprising the steps of: generating discontinuity information of an original image representing discontinuity of color information expressed by a line process, on the basis of the color information of the original image; extracting a contour of an object image included in the original image on the basis of the generated discontinuity information, and separating the object image by using the extracted contour; and determining outline information in which the contour of the object image is outlined on the basis of the discontinuity information with respect to the separated object image, and encoding color information of the object image.

In accordance with a second aspect of the present invention, in the image-component rendering method according to the first aspect of the invention, the contour of the original image is outlined by a parametric curve, and the color information is encoded by a parametric surface.

In accordance with a third aspect of the present invention, the image-component rendering method according to the first aspect of the invention further comprises the step of: further separating the object image into element images making up the object image so as to render the object image into components.

In accordance with a fourth aspect of the present invention, there is provided a recording medium in which an image-component rendering program is recorded for rendering from an original image an object image representing an object included in the original image into a component, wherein the image component-rendering program causes discontinuity information of an original image representing discontinuity of color information expressed by a line process to be generated on the basis of the color information of the original image; causes a contour of an object image included in the original image to be extracted on the basis of the generated discontinuity information, and causes the object image to be separated by using the extracted contour; and causes outline information in which the contour of the object image is outlined on the basis of the discontinuity information to be determined with respect to the separated object image, and causes color information of the object image to be encoded.

In accordance with a fifth aspect of the present invention, in the recording medium in which an image-component rendering program is recorded according to the fourth aspect of the invention, the contour of the original image is outlined by a parametric curve, and the color information is encoded by a parametric surface.

In the image-component rendering method in accordance with the above-described first aspect of the invention, discontinuity information of an original image representing discontinuity of color information expressed by a line process is generated on the basis of the color information of the original image. The line process expresses the discontinuity of color information, i.e., whether the color information is continuous or discontinuous. If an energy function is defined by the color information and the line process, and minimization of energy using the energy function is performed, the line process has a value at a location where the color information is discontinuous in the original image. The discontinuity information of the original image can be expressed by the line process having this value. Since this discontinuity information expresses the location where the color information is discontinuous in the original image, a boundary of color information is formed between adjacent color regions which are not formed by identical or similar color information and are formed by different color information. Accordingly, in the color region formed by identical or similar color information, discontinuity information appears in its contour portion. The object image included in the original image is composed of identical or similar color information, or is composed by a plurality of pieces of predetermined color information. Accordingly, a contour of the object image included in the original image is extracted on the basis of the discontinuity information. The object image is separated by using the contour thus extracted.

Next, with respect to the separated object image, outline information, in which the contour of the object image is outlined on the basis of the discontinuity information, is determined. By the outline information is meant information which is capable of changing the size, e.g., enlarging or reducing the size, while maintaining most of the original information (i.e., information pertaining to the contour). For instance, the outline information includes shape information which is formed of points, segments, and vector information such as surface information. This shape information can be described by a mathematical formula. By describing the contour of the object image by the outline information in this manner, it is possible to represent the contour of the object image without depending on the resolution. The color information of the original image is included within the contour of the original image, and becomes continuous without involving discontinuity, so that the color information of the object image is encoded by an expression based on continuous information. As this encoding, encoding which approximately expresses color information can be cited as one example, and an image data format known as JPEG or the like can be used as a reusable format.

Thus, since the contour of the original image is described by the outline information, and the color information of the original image is encoded in a reusable format, even in a case where the object image needs to be enlarged or reduced at the time of its reuse, the object image can be used in the format which maintains the contour of the original image without the contour of the object image depending on the resolution at the time of enlargement or reduction.

When the object image is represented, the contour is an outermost periphery of the original image, and forms a two-dimensional curve. In addition, the color information is included within the contour of the original image, and is continuous. The color information can be represented three-dimensionally for each color in relation to its position and density. Accordingly, the continuous color information can be made to correspond to a three-dimensional surface. Such a curve or surface is preferably represented in a format which can be easily handled. Therefore, as shown in the second aspect of the invention, the contour of the original image is outlined by a parametric curve, and the color information is encoded by a parametric surface. In this way, the contour and the color information of the original image can be represented in a simple description format by using formulae, thereby making it possible to use the original image easily.

There are cases where an object image is formed from a plurality of element images. For example, in a case where the object image is that of a person, there are cases where the object image is made up by such element images as the head, arms, torso, legs, and the like. Accordingly, as stated in the third aspect of the invention, the object is further separated image into element images making up the object image so as to be formed into components. In this way, the element images of the original image can be formed into components from the original image, and the original image to be reused can be subdivided.

The rendering of the object image into a component in accordance with the above-described image-component rendering method can be realized through a computer by executing an image-component rendering program recorded in the recording medium in accordance with the above-described fourth aspect of the invention. Specifically, the recording medium is one in which an image-component rendering program is recorded for rendering from an original image an object image representing an object included in the original image into a component, wherein the image component-rendering program causes discontinuity information of an original image representing discontinuity of color information expressed by a line process to be generated on the basis of the color information of the original image; causes a contour of an object image included in the original image to be extracted on the basis of the generated discontinuity information, and causes the object image to be separated by using the extracted contour; and causes outline information in which the contour of the object image is outlined on the basis of the discontinuity information to be determined with respect to the separated object image, and causes color information of the object image to be encoded. Consequently, the object image can be rendered into a component by the computer without the contour of the object image depending on the resolution at the time of enlargement or reduction.

It should be noted that, as shown in the fifth aspect of the invention, the contour of the original image can be outlined by a parametric curve which facilitates its handling, and the color information can be encoded by a parametric surface.

BRIEF DESCRIPTION OF THE DRAWINGS

FIG. 2 is a flowchart illustrating the flow of processing which is executed by the apparatus for rendering an object image into a component in accordance with the embodiment of the present invention;

FIG. 3 is an image diagram illustrating the process of extracting an object image from an original image;

FIGS. 6A to 6D are explanatory diagrams for explaining the line process applied to the image;

DESCRIPTION OF THE PREFERRED EMBODIMENTS

Referring now to the accompanying drawings, a detailed description will be given of an embodiment of the present invention. In this embodiment, the present invention is applied to an apparatus for rendering into a component an object image included in a color original image.

Figure 1:
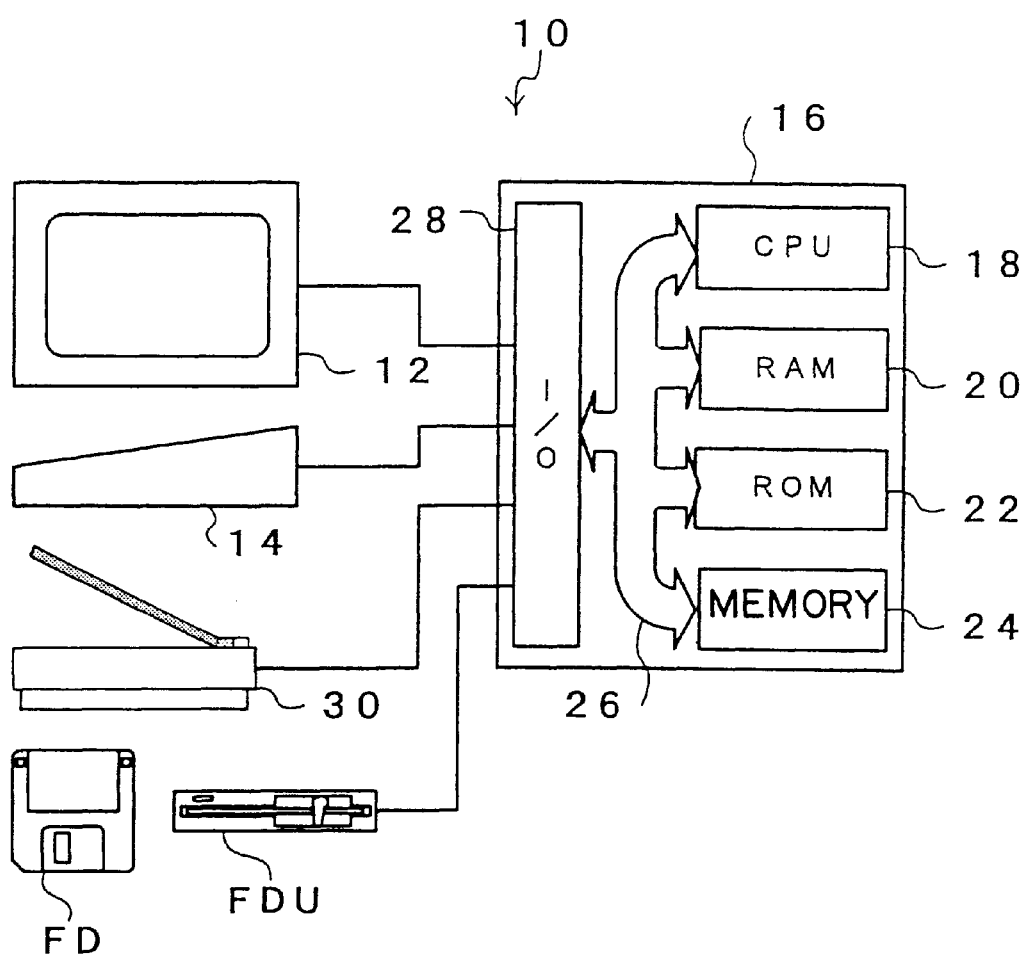
FIG. 1 is a block diagram illustrating a schematic configuration of an apparatus for rendering an object image into a component in accordance with an embodiment of the present invention.

As shown in FIG. 1, an apparatus 10 for rendering an object image into a component in this embodiment is comprised of a display 12 such as a display unit for displaying an image, an input device 14 such as a keyboard for inputting commands and data from the outside, an apparatus body 16, and an image reading device 30 for reading a color original image from a color original.

The apparatus body 16 is formed by a microcomputer having a CPU 18, a RAM 20, a ROM 22, and an input/output (I/O) port 28, which are connected by a bus 26 to permit the transmission and reception of commands and data. A processing routine which will be described layer and is executed by the apparatus body 16 is stored in the ROM 22.

A memory 24 for storing image data is connected to the input/output port 28 of the apparatus body 16. In addition, the input device 14 is connected to the input/output port 28 of the apparatus body 16, and the display 12 is also connected thereto. Further, the image reading device 30 such as a color scanner is connected to the input/output port 28.

The image reading device 30 is capable of reading a multi-level color original image from a color original such as printed matter and from a photographic film which, after photographing a subject, has been subjected to development processing and a negative image or a positive image has been made visible.

A floppy disk unit (hereafter referred to as the FDU) into which a floppy disk (hereafter referred to as the FD) serving as a recording medium can be inserted and from which it can be withdrawn is connected to the aforementioned input/output port 28. The processing routine and the like which will be described later can be written in the FD by using the FDU. Accordingly, the processing routine which will be described later may be recorded in advance in the FD without being stored in the ROM 22, and the processing program recorded in the FD may be executed by means of the FDU. In addition, a large-capacity storage device (not shown) such as a hard disk drive may be connected to the apparatus body 16, and the processing program recorded in the FD may be stored (installed) in the large-capacity storage device (not shown) and may be executed. Further, recording media further include optical disks, such as a CD-ROM, and magneto-optical disks, such as an MD, an MO, and the like. When they are to be used, it suffices if a CD-ROM drive, an MD drive, an MO drive and the like are used instead of or in addition to the aforementioned FDU.

In this embodiment, by way of example, a description will be given of a case in which a multi-level color original image is inputted by the image reading device 30 such as a color scanner. However, the present invention is not limited to the same, and image data stored in advance in the recording medium such as the FD may be inputted. In addition, a signal transmitting/receiving device such as a network board may be connected to the input/output port 28 to form a so-called LAN which permits transmission and reception of signals with other devices, and image data may be received from other devices.

In addition, the multi-level color original images include black-and-white images, bi-level images based on a combination of different colors, and images such as actually photographed images and natural images.

Next, a description will be given of the operation of this embodiment. If the power supply of the apparatus 10 for rendering an object image into a component is turned on, the processing routine shown in FIG. 2 is executed. This processing routine may be stored in a recording medium such as the FD, may be presented as application software which can be executed by a computer, and may be executed by an execution command.

First, in Step 100, a color original image (hereafter referred to as the original image) is read by reading a color original placed on the image reading device 30. In this embodiment, it is assumed that RGB data is outputted from the image reading device 30, and that this outputted RGB data is used. It should be noted that if the image data is image data represented by another color system such as CMYK data, it suffices if an RGB transformation is carried out.

FIG. 3 shows one example of an original image 40 for which reading has been completed. In the original image 40, flowering plants 50 are scattered around a person 52, a garden tree 48 is located in their vicinity, a mountain 42 and a small mountain 44 are located in the far distance (in an upper portion of the image), and a cloud 46 is located above.

In an ensuing Step 102, discontinuity information is detected with respect to the original image on the basis of a line process. In the line process, virtual elements indicating discontinuity of line elements are detected. In this embodiment, a description will be given of a case in which information on the discontinuity of an image is detected by a neural network using the line process. First, a detailed description will be given of the line process.

Figure 4A:
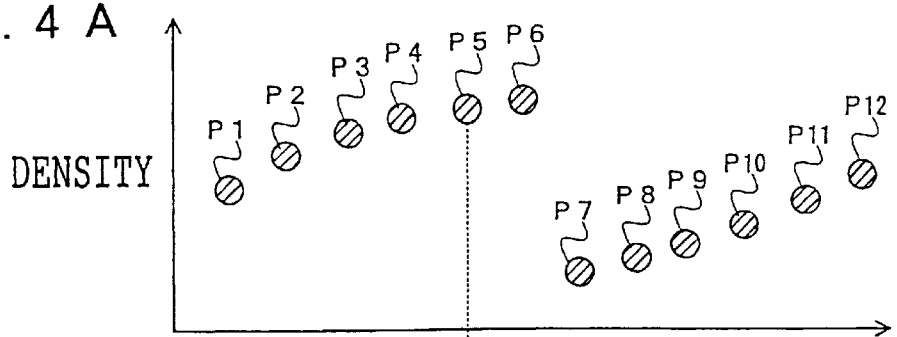
FIGS. 4A, 4B and 4C are explanatory diagrams for explaining a line process.
Figure 4B:
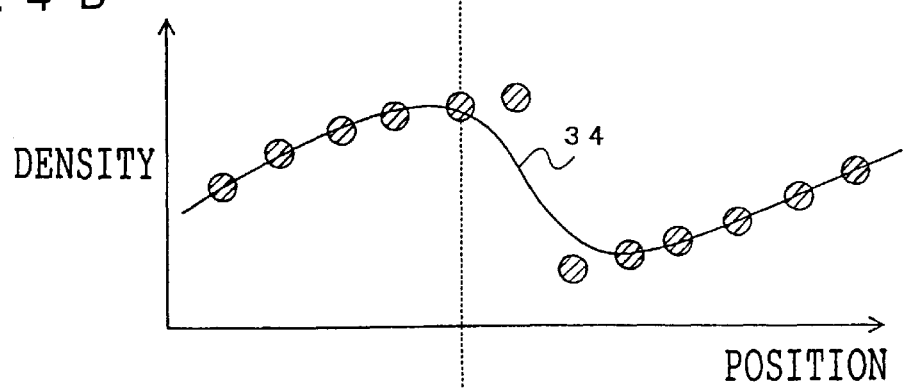

FIG. 4A shows one example of one-dimensional data in which the relationship between the position and the density is determined with respect to pixels, wherein points P1 to P6 and points P7 to P12 are respectively located substantially close to each other, and the point P6 and the point P7 are wide apart. If a curve conforming to these one-dimensional data is determined, and if the curve is determined by an approximation method such as the method of least squares or an interpolation method, as shown in FIG. 4B, a curve 34 is determined in such a manner as to be wide apart from the point P6 and the point P7 but to be smooth, so as to make the points P1 to P6 and the points P7 to P12 continue by the curve.

Figure 4C:
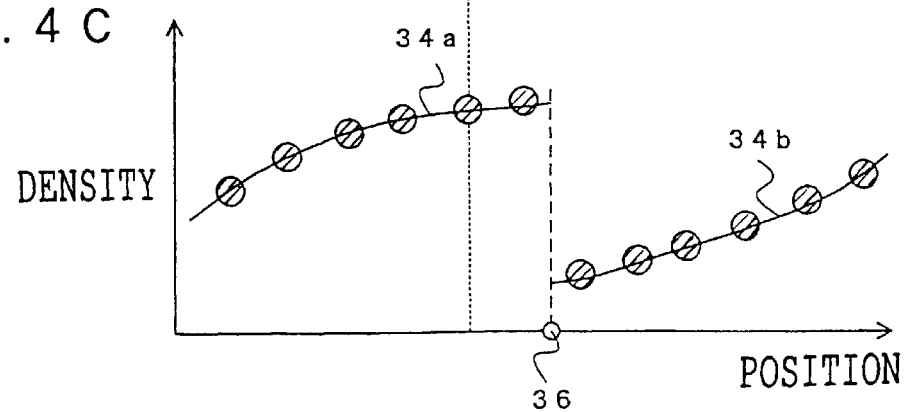

However, since the points P6 and P7 are wide apart from the curve 34, a resultant characteristic (i.e., the curve 34) does not conform to the actual data. Accordingly, as shown in FIG. 4C, curves 34$a$ and 34$b$ are determined with respect to the points P1 to P6 and the points P7 to P12 which are respectively located substantially close to each other, so as to conform to the respective points. If the curves are thus determined, discontinuity occurs between the point P6 and the point P7 which are wide apart. If the curves 34$a$ and 34$b$ are determined by accompanying a discontinuous point 36 at a position between the point P6 and the point P7, it is possible to determine a characteristic which conforms to the actual data. Namely, the line process which indicates the occurrence of discontinuity is on at the discontinuous point 36 at the position between the point P6 and the point P7. Meanwhile, the line process is off between the respective points P1 to P6 and P7 to P12, i.e., between the points P1 and P2, between the points P2 and P3, . . . , and between the points P5 and P6, as well as between the points P7 and P8, between the points P8 and P9, . . . , and between the points P11 and P12.

In the above, a description has been given of the case of one-dimensional data, but in a case where the line process is applied to an image typified by two-dimensional data, the line process is defined as a virtual function with respect to the relation between two pixels. Accordingly, as the defined line process becomes on and off depending on a local density difference, a discontinuous portion in the image can be extracted as discontinuity information, and such discontinuous portions connected together can be extracted as a contour of the object image.

By using this line process, the discontinuity (information) of the image is determined by performing the calculation of an energy function and its minimization by a neural network using this line process. A description will be given of the details of this determination.

Figure 5:
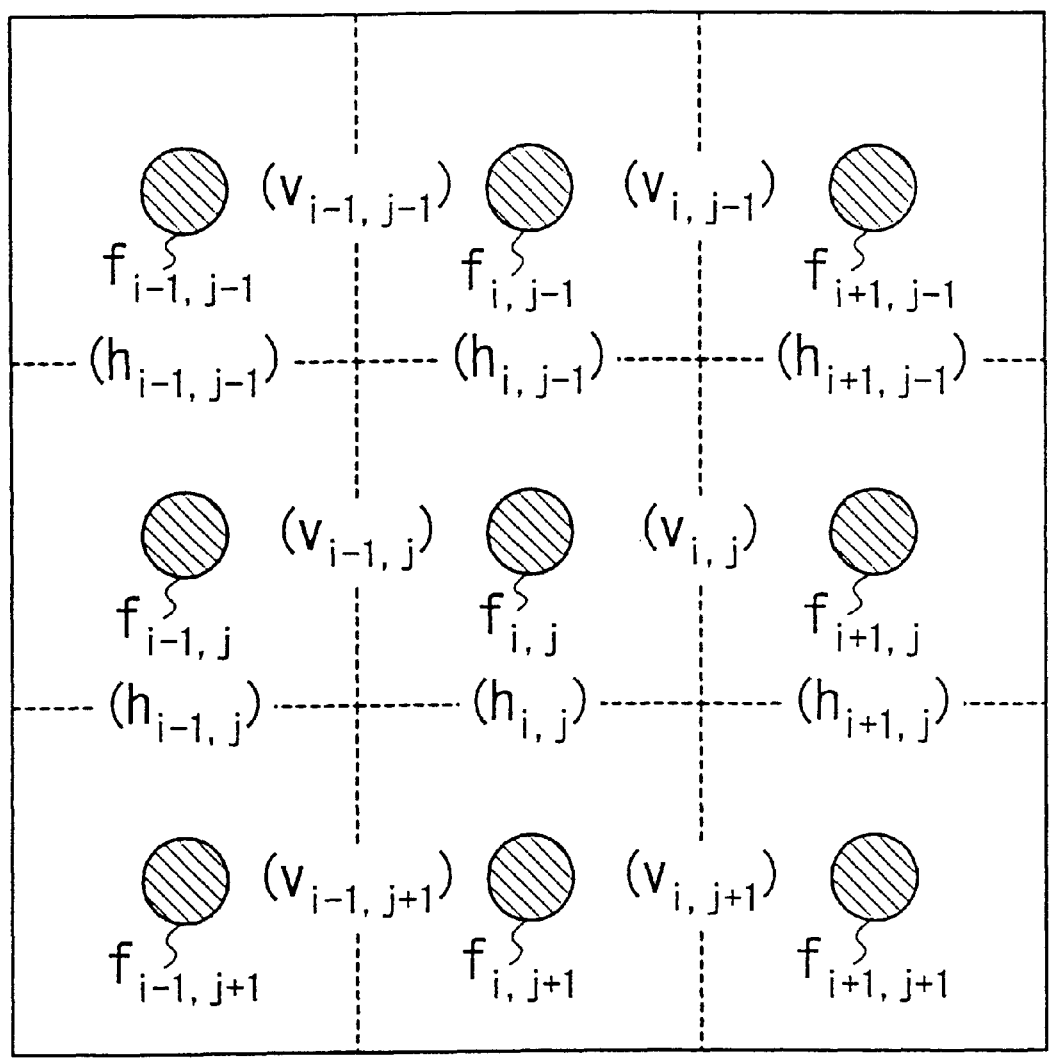
FIG. 5 is a conceptual diagram for explaining a neural network using the line process.

FIG. 5 is a conceptual diagram explaining the neural network using the line process. As shown in FIG. 5, in this neural network, if an input is an image, three neurons $f_{i,j}$, $h_{i,j}$, and $v_{i,j}$ correspond to one pixel corresponding to the image.

Here, $f_{i,j}$ is a value of the pixel, and $h_{i,j}$ and $v_{i,j}$ are hidden functions called line processes which show the presence or absence of discontinuity between $f_{i,j}$. Namely, $f_{i,j}$ shows a change in the intensity of an inputted value, while $h_{i,j}$ and $v_{i,j}$ respectively show the continuity and discontinuity in the horizontal direction and the vertical direction of $f_{i,j}$.

The energy function of the overall system is defined by these three variables $f_{i,j}$, $h_{i,j}$, and $v_{i,j}$ as shown in Formula (1) below.

$$E = E_I + E_D + E_V + E_P + E_C + E_L + E_G \quad (1)$$

$$E_I = \sum_{ij} [(f_{i,j+1} - f_{i,j})^2 (1 - h_{i,j}) + (f_{i+1,j} - f_{i,j})^2 (1 - v_{i,j})]$$

$$E_D = C_D \sum_{ij} (f_{i,j} - d_{i,j})^2$$

$$E_V = C_V \sum_{ij} [h_{i,j}(1 - h_{i,j}) + v_{i,j}(1 - v_{i,j})]$$

$$E_P = C_P \sum_{ij} (h_{i,j} \cdot h_{i,j+1} + v_{i,j} \cdot v_{i+1,j})$$

$$E_C = C_C \sum_{ij} (h_{i,j} + v_{i,j})$$

$$E_L = C_L \sum_{ij} [h_{i,j}\{(1 - h_{i+1,j} - v_{i,j} - v_{i,j+1}) + (1 - h_{i-1,j} - v_{i-1,j} - v_{i-1,j+1})\} +$$

$$v_{i,j}\{(1 - v_{i,j+1} - h_{i,j} - h_{i+1,j}) + (1 - v_{i,j-1} - h_{i,j-1} - h_{i+1,j-1})\}]$$

$$E_G = C_G \sum_{ij} \left[ \int_0^{hi} g_{i,j}^{-1}(h_{i,j}) dh_{i,j} + \int_0^{vi} g_{i,j}^{-1}(v_{i,j}) dv_{i,j} \right]$$

where, $E_I$: continuity of a surface (depth)
$E_D$: reliability of observed data (initial value)
$E_V$: heading of the line process toward a corner (0 or 1) of a hyperspherical surface
$E_P$: condition whereby a parallel line process in the neighborhood becomes 1
$E_C$: condition whereby a single line process becomes 1
$E_L$: condition which prefers a continuous multi-line process, and dislikes intersection and discontinuity
$E_G$: condition whereby m and n in Formula (2) do not diverge
$C_D$, $C_V$, $C_P$, $C_C$, $C_L$, $C_G$: parameter values
g( ): sigmoid function
$d_{i,j}$: initial value In addition, a time rule concerning the variables is defined by the following Formula (2).

$$\left. \begin{array}{l} df_{i,j}/dt = \partial E/\partial f_{i,j} \\ dm_{i,j}/dt = \partial E/\partial h_{i,j} \\ dn_{i,j}/dt = \partial E/\partial v_{i,j} \end{array} \right\} \quad (2)$$

where, $g(U_i) = 1/e(-2\lambda U_i)$

Incidentally, $e(-2\lambda U_i)$ is an exponential function, and the value within the parentheses ( ) represents an exponent portion.

$h_{i,j} = g(m_{i,j})$
$v_{i,j} = g(n_{i,j})$
m, n: internal state variables

Examples of calculation of partial differentiation in Formula (2) above are shown in Formulae (3), (4), and (5) below.

$$\frac{\partial E}{\partial f_{i,j}} = \frac{\partial}{\partial f_{i,j}} \cdot [\{\cdots + (f_{i,j} - f_{i,j-1})^2 (1 - h_{i,j}) + (f_{i,j+1} - f_{i,j})^2 (1 - h_{i,j}) + \cdots\} \quad (3)$$

$$\{\cdots + (f_{i,j} - f_{i,j-1})^2 (1 - v_{i,j}) + (f_{i,j+1} - f_{i,j})^2 (1 - v_{i,j}) + \cdots\}]$$

$$= 2(f_{i,j} - f_{i,j-1})(1 - h_{i,j-1}) - 2(f_{i,j+1} - f_{i,j})(1 - h_{i,j-1}) +$$

$$2(f_{i,j} - f_{i,j-1})(1 - v_{i,j-1}) - 2(f_{i,j+1} - f_{i,j})(1 - v_{i,j-1})$$

$$\partial E/\partial h_{i,j} = -(f_{i,j+1} - f_{i,j})^2 \quad (4)$$

$$\partial E/\partial v_{i,j} = -(f_{i+1,j} - f_{i,j})^2 \quad (5)$$

A state in which the results of calculation of Formulae (3) to (5) above become small, i.e., become close to 0 or assume values of 0, is a state in which adjacent values $f_{i,j+1}$ and $f_{i,j}$ and adjacent values $f_{i+1,j}$ and $f_{i,j}$ assume substantially the same values. Therefore, if it is assumed that $f_{i,j+1} \approx f_{i,j}$ and $f_{i+1,j} \approx f_{i,j}$ with respect to energy $E_I$ expressed by Formula (1) above, because energy $E_I$ becomes relatively small, there is no need for the line processes $h_{i,j}$ and $v_{i,j}$ to have values, so that $h_{i,j}$ and $v_{i,j}$ assume relatively small values.

Meanwhile, if differences between adjacent values $f_{i,j+1}$ and $f_{i,j}$ and adjacent values $f_{i+1,j}$ and $f_{i,j}$ are large, i.e., if there are boundaries between the adjacent values, $(f_{i,j+1} - f_{i,j})^2$ and $(f_{i+1,j} - f_{i,j})^2$ become large. Accordingly, in order to make energy EI small, it is necessary for $h_{i,j}$ or $v_{i,j}$ to have values and for $(1 - h_{i,j})$ or $(1 - v_{i,j})$ to become relatively small. In the case where there is a difference between the adjacent values $f_{i,j}$ and $f_{i,j+1}$ or between the adjacent values and $f_{i,j}$ and $f_{i+1,j}$, the line processes $h_{i,j}$ and $v_{i,j}$ located between the respective values come to have values, so that a boundary line appears between regions of different colors.

The condition for the line process to be generated is determined from this coefficient. By way of example, the condition for the single line process shown in FIG. 6A to be generated is $E_P=0$, $E_C=0$, and $E_L=2C_L$; the condition for the continuous line processes shown in FIG. 6B to be generated is $E_P=0$, $E_C=0$, and $E_L=C_L$; the condition for the mutually parallel line processes shown in FIG. 6C to be generated is $E_P=C_P$, $E_C=C_C$, and $E_L=2C_L$; and the condition for the mutually intersecting line processes shown in FIG. 6D to be generated is $E_P=0$, $E_C=2C_C$, and $E_L=10C_L$.

The results of conducting energy learning, in which the calculation for minimizing the energy of the overall system is repeated by Formulae (1) to (5) above, become solutions of the neural network with respect to a given input.

In this neural network, (a) if the input is an image with noise added thereto, $f_{i,j}$ at the minimum energy obtained corresponds to a restored image; (b) if the input is a contrast image, $h_{i,j}$ and $v_{i,j}$ at the minimum energy obtained corresponds to a contour; (c) if the input is surveyed data on a mountain or the like, $f_{i,j}$ at the minimum energy obtained shows the altitude of each spot estimated from a surveying point. In this embodiment, the example given is that of (b) in which the neural network is used in the input of images.

It should be noted that the above-described neural network has expandability in that it can be used in various inverse problems depending on what are assigned to the variables. Since an algorithm is realized by local calculations, it is easy to adopt parallel processing hardware using light, so that the above-described neural network has an advantage in that high-speed processing can be effected.

Accordingly, in Step 102 in FIG. 2, a contour portion of the image is extracted as discontinuity is detected by performing the calculation of the energy function and its minimization by a neural network using the aforementioned line process.

Next, in Step 104, color regions of similar colors in the original image are set. This similar-color setting processing is processing in which similar colors, identical colors, and colors or groups of colors that are designated by predetermined combinations of colors are labeled on the original image. For instance, a method is known in which integration processing and the like are performed with respect to the respective pixels in the original image by an iterative type region expansion method on the basis of the distance determined in a color space of a coordinate system having a hue value axis, a saturation value axis, and a lightness value axis which are perpendicular to each other (hereafter, this color space will be referred to as the HLS color space).

Specifically, one of the pixels is selected from the original image. Next, one pixel (one pixel of the so-called 8-neighbors) in the vicinity of the pixel is selected, and if the selected pixel is included in a region to which some label has already been attached, that label is attached. On the other hand, if the selected pixel is not included in such a region, the distance between the selected two pixels in the HLS color space, i.e., the similarity in the lightness, saturation, and hue of the two pixels, is determined. The longer the distance, the lower the similarity, whereas the shorter the distance, the higher the similarity. When the distance is less than a predetermined value, it is assumed that the two pixels are similar, and an identical label is imparted to the two pixels (labeling). When the distance is greater than or equal to the predetermined value, it is assumed that the two pixels are dissimilar, and the aforementioned processing is performed with respect to the other pixels of the 8-neighbors without labeling these pixels. When processing is completed with respect to all the pixels of the 8-neighbors, one pixel at the outermost periphery of the region (in the original image) to which the same label has been attached is selected, and the aforementioned processing is repeatedly performed. The above processing is executed for all the pixels. As the attachment of the same label is sequentially executed with respect to the neighboring pixels having high similarity among the pixels at the outermost periphery of the region with the same label attached thereto, a color region comprising pixels which are similar in the hue, lightness, and saturation in the original image is set. Incidentally, as for the groups of pixels to which the same label has been attached, mean values of the hue value, saturation value, and lightness value are respectively determined, and the mean values thus determined are set as the hue value, saturation value, and the lightness value of the label.

It should be noted that because the color region designated by the same label does not include a discontinuous portion, the discontinuity, i.e., the contour, which has been detected at least in Step 102 is not divided.

After the color region has been set in the similarity of the hue, lightness, and saturation with respect to the neighboring pixels of the original image in Step 104 as described above, in an ensuing Step 106, the original image is classified. This classification is processing for determining the relationship among the color regions of similar colors which have been set in the aforementioned original image. Namely, there is a high possibility that those groups of pixels that are identical or similar in the hue, lightness, and saturation in the color region with one label attached thereto are the same object. However, there is a high possibility that a color region of a similar color which is located at a distant position in the original image is an object of the same kind. Accordingly, values and ranges of the hue, lightness, and saturation for sorting (classifying) similar color regions are set in advance, and the original image is classified by classifying the color regions according to the predetermined values and ranges.

It should be noted that although, in this embodiment, a description will be given of an example in which the relationship is determined among the color regions of similar colors set for the original image, and classification is carried out, since the discontinuity information corresponds to a contour portion of the object image, classification may be carried out on the basis of the similarity of the discontinuity information (contour).

Specifically, if the original image 40 shown in FIG. 3 is taken as an example, the original image 40 can be classified into a scenery class CA including the mountain 42, the small mountain 44, and the cloud 46, an environment class CB including the scattered flowering plants 50 and the garden tree 48, and a person class CC including the person 52.

In an ensuing Step 108, images are extracted for the respective classified groups. Specifically, if the original image 40 shown in FIG. 3 is taken as an example, the scenery class CA is extracted as a class image 54 including the mountain 42, the small mountain 44, and the cloud 46. A slightly large region is set for this class image 54 so as to keep intact the positional relationship among the mountain 42, the small mountain 44, and the cloud 46 in the original image and such that at least these images will not be divided. Incidentally, the background of the original image 40 may be left as it is in the class image 54, or the aforementioned images may be pasted on a new background, e.g., a predetermined background color. Similarly, the environment class CB is extracted as a class image 56 including the scattered flowering plants 50 and the garden tree 48, and the person class CC is extracted as a class image 58 including the person 52.

There are cases where a plurality of object images are included in the class images which are extracted as described above. Accordingly, although a detailed concrete example will be described later, first, in Step 110, one class image among the class images extracted in the aforementioned Step 108 is designated. Next, in Step 112, one object image is extracted, and in an ensuing Step 114 the discontinuity information is formed into an outline by using a Bezier curve.

In an ensuing Step 116, the object image is described by the outlined contour and in the color in which the color information of the object image is encoded. In an ensuing Step 118, a determination is made as to whether or not all the object images included in the class designated in the aforementioned Step 110 have been extracted. If an unextracted object image remains, NO is given as the answer in this determination, and the operation returns to Step 112. If the extraction of all the object images has been completed, the operation proceeds to an ensuing Step 120. In Step 120, a determination is made as to whether or not all the above-described processing has been completed for all the class images included in the original image, and if an unprocessed class image remains, NO is given as the answer in this determination, and the operation returns to Step 110. If the processing of all the class images has been completed, this routine ends.

Next, referring to FIG. 3, a specific description will be given of processing in and after Step 110 in FIG. 2. Object images of the mountain 42, the small mountain 44, and the cloud 46 are included in the class image 54 of the scenery class CA shown in FIG. 3. These object images are separated from the class image 54 and are extracted. This separation and extraction are effected by using discontinuity information. Since the discontinuity information corresponds to the contour portion of the object image, the region surrounded by the discontinuity information is set as the object image. The region surrounded by this discontinuity information is a closed region based by a curve formed by connecting discontinuous points corresponding to the contour portion of the object image, but is not limited to one closed region. Namely, this region may be a group of regions consisting of a plurality of closed regions. Incidentally, as for the closed region based on the curve formed by connecting the discontinuous points, the closed region may be generated by a curve which is obtained by connecting parametric curves, as will be described later.

For example, three regions surrounded by discontinuity information are set in the class image 54. These three regions are consecutively set, and discontinuity information and color information of the region surrounded by the discontinuity information, i.e., the respective values of the hue, lightness, and saturation with respect to the pixels within the region, are extracted, and a mountain image 60, a small mountain image 62, and a cloud image 64 are extracted. It should be noted that, in the example shown in FIG. 3, an image in which a background image is added to each extracted image is set as the object image with respect to each of the mountain image 60, the small mountain image 62, and the cloud image 64.

Similarly, a flowering plant image 66 and a garden tree image 68 are extracted from the class image 56 in the environment class CB, and a person's head image 70, an arm image 72, a torso image 74, and a leg image 76 are extracted from the class image 58 in the person class CC.

Next, the contour (discontinuity information) of the extracted image is outlined as shown below. A parametric curve which is easy to describe is adopted to outline the discontinuity information. In particular, in this embodiment, the Bezier curve which is easy to handle among the parametric curves is adopted. A formula for determining this Bezier curve P(t) is shown by the following Formula (6):

$$P(t) = \sum_{i=0}^{n} P_i \cdot B_i^n(t) \quad (6)$$

where, $$B_i^n(t) = (1-t)B_i^{n-1}(t) + tB_{i-1 n-1}(t)$$

$$B_j^n(t) = 0 \ (j \approx n)$$
$$= 1 (j = n)$$

Pi: control point (discontinuous point)
t: parameter

By outlining the contour portion of the object image in the above-described manner, the contour shape is maintained even if the object image is enlarged or reduced. Then, by describing the object image by this outlined contour and in the color based on the color information (preferably encoded) of the object image, it becomes possible to describe (render into a component) the object image in a reusable format.

Although a description has been given above of the example in which the object image is described by the outlined contour and in the color based on the color information of the object image, the present invention is not limited to the same, and additional information may be used to describe the object image. For example, in a case where an image such as a line drawing or a pattern is included in the object image, or the object image has been subjected to fixed processing such as mask processing or focus processing, that image or processing may be included in the additional information. Namely, the description concerning the object image may be subdivided by a pattern such as lines or gradations, or may be subdivided by the processing carried out.

In addition, although a description has been given above of the case in which a parametric curve is used, the present invention is not limited to use of a parametric curve, and another approximate curve may be used.

Next, a description will be given of a case in which an object image which has been rendered into a component is enlarged. In the following description, a description will be given by citing an example in which color information of the object image is encoded by using a nonuniform rational B-spline (NURBS) surface. A formula for determining NURBS as this parametric surface is shown by the following Formula (7)

$$S(u, v) = \frac{\sum_{i=0}^{pn} \sum_{j=0}^{pm} w_{ij} N_i^n(u) N_j^m(v) P_{ij}}{\sum_{i=0}^{pn} \sum_{j=0}^{pm} w_{ij} N_i^n(u) N_j^m(v)} \quad (7)$$

where, $$N_i^1(t) = 1 \ (t_i < t_{i+1})$$
$$= 0 \ (t_i \geq t_{i+1})$$

$$N_i^n(t) = \frac{t - t_i}{t_{i+n} - t_i} N_i^{n-1}(t) + \frac{t_{i+n+1} - t}{t_{i+n+1} - t_{i+1}} N_{i+1}^{n-1}(t)$$

m, n: surface configurations
u, v, t: parameters
$t_i$: knot point
$N_i^n$, $N_j^m$: fundamental functions
$w_{ij}$: weight
$P_{ij}$: control point
pn, pm: numbers of control points Hereafter, referring to FIGS. 7 and 8, a description will be given of a case in which the resolution is expanded twice (area ratio: 4 times) by using cubic NURBS.

Figure 8:
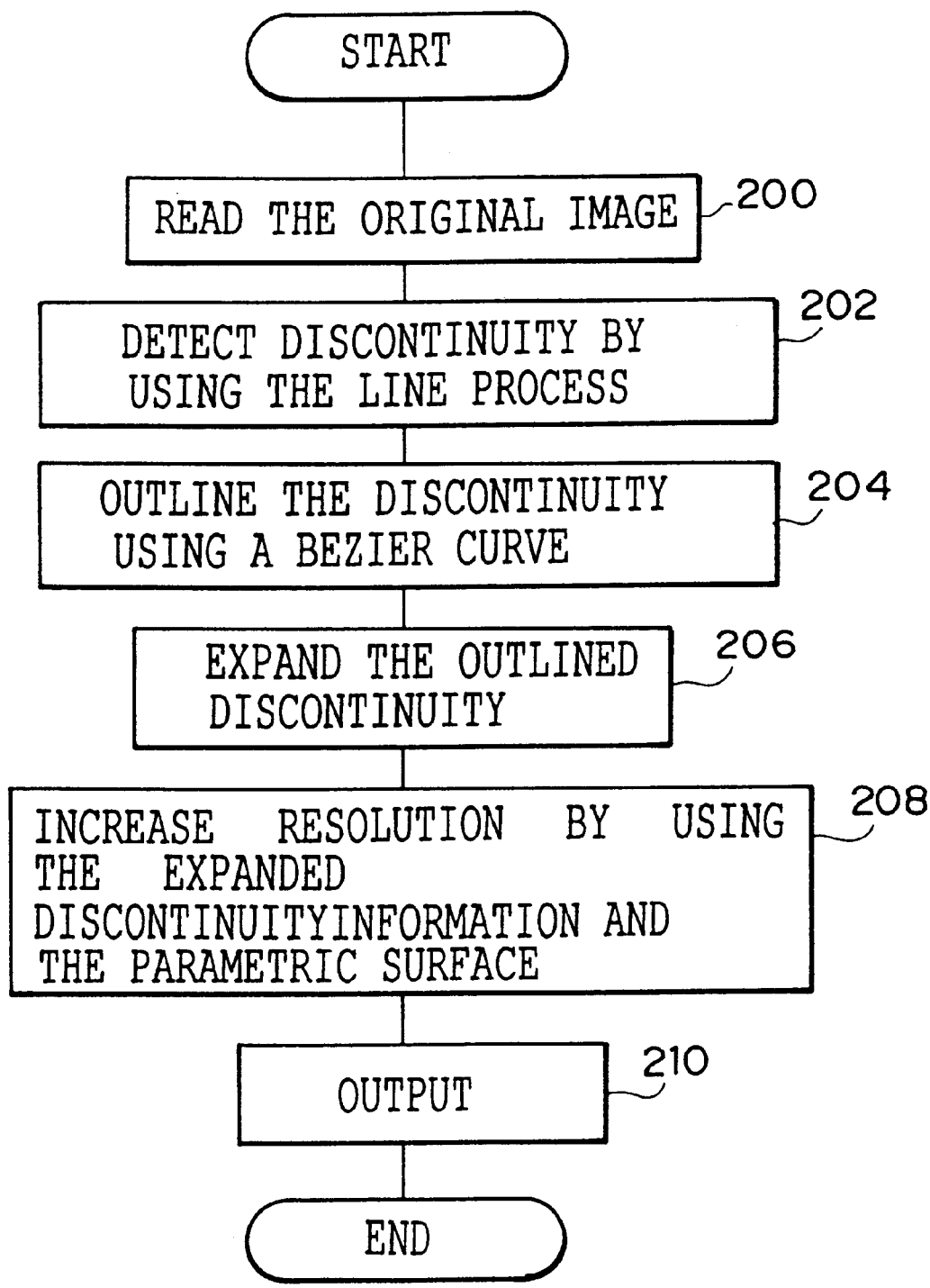
FIG. 8 is a flowchart illustrating the flow of processing for enlarging the original image.

In Step 200 in FIG. 8, the reading of the original image corresponding to Step 100 in FIG. 2 is effected. In an ensuing Step 202, the original image thus read is subjected to discontinuity detection by means of the line process, which corresponds to Step 102 in FIG. 2. In an ensuing Step 204, outlining which corresponds to Step 114 in FIG. 2 is effected. In an ensuing Step 206, the outlined discontinuity information is expanded, and in an ensuing Step 208, the resolution is increased by using the expanded discontinuity information and the parametric surface. Then, in an ensuing Step 210, an image with an increased resolution is outputted.

Figure 7:
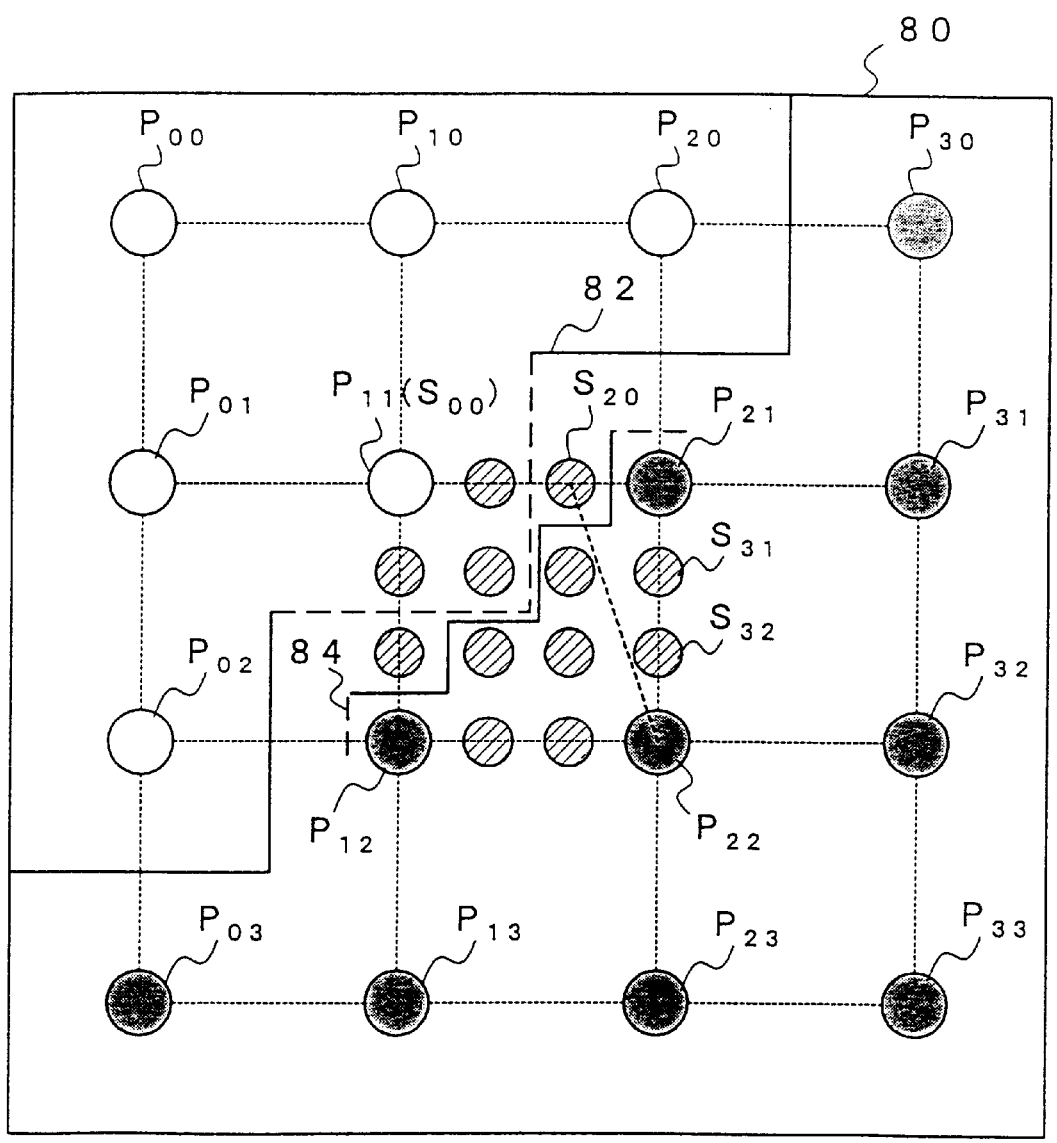
FIG. 7 is an explanatory diagram for explaining the arrangement of an image when the resolution is enlarged by using NURBS.

FIG. 7 shows a configuration in which an image 80 is composed by 4×4 (a total of 16) pixels which make up a portion of an original image, and the respective pixels are used as control points $P_{ij}$ ($0 \leq i \leq 3$, $0 \leq j \leq 3$). A curve 82 is a curve which is obtained in a case where the discontinuity information extracted by the above-described line process is enlarged as it is, and a curve 84 is a curve which is obtained in a case where after the above-described discontinuity information is outlined, the discontinuity information is enlarged.

It is assumed that, as for the image, approximately half of the pixels are white pixels, and the others are black pixels, and values of white are set to the control points $P_{00}$, $P_{10}$, $P_{20}$, $P_{01}$, $P_{11}$, and $P_{20}$, and values of black are set to $P_{30}$, $P_{21}$, $P_{31}$, $P_{12}$, $P_{22}$, $P_{32}$, $P_{03}$, $P_{13}$, and $P_{23}$.

In this embodiment, pixels are newly added as virtual points S among the control points $P_{00}$ to $P_{33}$ during the aforementioned enlargement. For example, virtual points $S_{mn}$ ($0 \leq m \leq 3$, $0 \leq n \leq 3$) are added within the range surrounded by the control points $P_{11}$, $P_{12}$, $P_{21}$, and $P_{22}$.

The pixel values of these added virtual points S are determined by referring to the pixel values (pixel values of the control points) of the original image in their neighborhood. In this embodiment, the pixel values are determined by taking the discontinuity in the original image into consideration. Namely, the pixel values of the pixels which exceed the curve 84 which is the discontinuity information are not used. For instance, when the pixel value of the virtual point $S_{20}$ is determined, the control point P11 is referred to since a straight line connecting the control point $P_{11}$ and the virtual point $S_{20}$ does not intersect the curve 84, but the control point $P_{22}$ is not referred to since a straight line connecting the control point $P_{22}$ and the virtual point $S_{20}$ intersects the curve 84. More specifically, the weight in formula (7) expressing the aforementioned NURBS is set to "0" so as to be reflected in the calculation. As a result, the pixel value of the virtual point $S_{20}$ becomes a value of a white pixel. Similarly, calculation of the other virtual points is performed to determine their pixel values.

If the discontinuity information is thus outlined and enlarged, it is possible to obtain an edge in which blurring is suppressed. Consequently, jagged portions at the edge at the time of enlargement of the image can be suppressed.

Although a description has been given above of the example of white pixels and black pixels, pixels values may be determined by determining estimated values based on averaging or a gradient.

As described above, in this embodiment, discontinuity information in the original image is detected by using the line process, and an object image included in the original image is extracted by using the discontinuity information. In addition, even in a case where the contour of the object image has been outlined by using the discontinuity information and the resolution has been changed, e.g., enlargement has been performed, an image can be generated without blurring or coarsening the contour of the object image. Consequently, it is possible to describe the object image by rendering it into a component without depending on the resolution, and reuse of the object image can be facilitated.

Although in this embodiment a description has been given of the case in which color information is encoded by using NURBS among the parametric surfaces, in the case of a surface which does not include discontinuity, it is possible to use bicubic. In addition, NURBS may be used in the case of a surface which included discontinuity, and bicubic may be used in the case of a surface which does not include discontinuity.

What is claimed is:

1. A recording medium in which an image-component rendering program is recorded for rendering from an original image an object image representing an object included in the original image into a component,
   wherein said image component-rendering program
   causes discontinuity information of an original image representing discontinuity of color information expressed by a line process to be generated on the basis of the color information of each of a plurality of pixels which form the original image;
   causes a contour of an object image included in the original image to be extracted on the basis of the generated discontinuity information; and
   causes outline information in which the contour of the object image is represented by a curve expression,
   wherein the contour of the original image is outlined by a parametric curve, and the color information is encoded by a parametric surface.

2. The recording medium in which an image-component rendering program is recorded according to claim 1, wherein the object image is further separated into element images making up the object image so as to render the object image into components.

3. An image-component rendering method comprising the steps of:
   generating discontinuity information of an original image representing discontinuity of color information expressed by a line process, on the basis of the color information of each of a plurality of pixels which form the original image;
   extracting a contour of an object image included in the original image on the basis of the generated discontinuity information; and
   determining outline information in which the contour of the object image is represented by a curve expression,
   wherein the line process comprises an energy function analysis of adjacent pixels among the pixels forming the original image.

4. An image-component rendering method comprising the steps of:
   generating discontinuity information of an original image representing discontinuity of color information expressed by a line process, on the basis of the color information of each of a plurality of pixels which form the original image;
   extracting a contour of an object image included in the original image on the basis of the generated discontinuity information;
   determining outline information in which the contour of the object image is represented by a curve expression; and
   obtaining a value for each of a plurality of virtual points, which virtual points are arranged in a density different from a density of the pixels forming the original image, based on
   a) pixel values of pixels which form the original image and are positioned in a neighborhood of each virtual point, and
   b) a position of each virtual point and positions of the pixels which form the original image and are positioned in the neighborhood of each virtual point, relative to a position of the contour presented by the curve expression.

5. The image-component rendering method according to claim 4, wherein the step of obtaining the value for each of a plurality of virtual points is carried out by representing the virtual points with a surface expression and determining a weight of the surface expression for each of pixel values of the pixels, which form the original image and are positioned in the neighborhood of each virtual point, based on the position information of each virtual point and the position of the pixels which form the original image and are positioned in the neighborhood of each virtual point, relative to the position of the contour represented by curve expression.

6. The image-component rendering method according to claim 4, further comprising the step of:

resizing the contour represented by the curve expression, wherein the position information is a position information relative to a resized contour represented by the curve expression.

7. The image-component rendering method according to claim 4, wherein the curve expression is a formula expressing a parametric curve, and the surface expression is a formula expressing a parametric surface.

8. A recording medium in which an image-component rendering program is recorded for rendering from an original image an object image representing an object included in the original image into a component, wherein said image component-rendering program causes discontinuity information of an original image representing discontinuity of color information expressed by a line process to be generated on the basis of the color information of each of a plurality of pixels which form the original image;

causes a contour of an object image included in the original image to be extracted on the basis of the generated discontinuity information; and causes outline information in which the contour of the object image is represented by a curve expression, wherein the line process comprises an energy function analysis of adjacent pixels among the pixels forming the original image.

9. A recording medium in which an image-component rendering program is recorded for rendering from an original image an object image representing an object included in the original image into a component, wherein said image component-rendering program causes discontinuity information of an original image representing discontinuity of color information expressed by a line process to be generated on the basis of the color information of each of a plurality of pixels which form the original image;

causes a contour of an object image included in the original image to be extracted on the basis of the generated discontinuity information; and causes outline information in which the contour of the object image is represented by a curve expression, wherein said image component-rendering program further causes a value for each of a plurality of virtual points, which virtual points are arranged in a density different from a density of the pixels forming the original image, to be obtained based on a) pixel values of pixels which form the original image and are positioned in a neighborhood of each virtual point, and b) a position of each virtual point and positions of the pixels which form the original image and are positioned in the neighborhood of each virtual point, relative to a position of the contour represented by the curve expression.

10. The recording medium in which an image-component rendering program is recorded according to claim 9, wherein the value for each of a plurality of virtual points is obtained by representing the virtual points with a surface expression and determining a weight of the surface expression for each of pixel values of the pixels, which form the original image and are positioned in the neighborhood of each virtual point, based on the position information of each virtual point and the position of the pixels which form the original image and are positioned in the neighborhood of each virtual point, relative to the position of the contour represented by curve expression.

11. The recording medium in which an image-component rendering program is recorded according to claim 9, wherein said image component-rendering program further causes the contour represented by the curve expression to be resized, and the position information is a position information relative to a resize contour represented by the curve expression.

12. The recording medium in which an image-component rendering program is recorded according to claim 9, wherein the curve expression is a formula expressing a parametric curve, and the surface expression is a formula expressing a parametric surface.

13. An image-component rendering method comprising the steps of:

generating discontinuity information of an original image representing discontinuity of color information expressed by a line process, on the basis of the color information of each of a plurality of pixels which form the original image;

classifying the original image into a plurality of classes based on at least one of the color information and the discontinuity information;

extracting a image of each class from the original image on the basis of the discontinuity information, and extracting a contour of an object image from the image of each class on the basis of the discontinuity information;

determining outline information in which the contour of the object image is represented by a curve expression; and obtaining a value for each of a plurality of virtual points, which virtual points are arranged in a density different from a density of the pixels forming the original image, based on a) pixel values of pixels which form the original image and are positioned in a neighborhood of each virtual point, and b) a position of each virtual point and positions of the pixels which form the original image and are positioned in the neighborhood of each virtual point, relative to a position of the contour represented by the curve expression.

14. An image-component rendering method comprising the steps of:

generating discontinuity information of an original image representing discontinuity of color information expressed by a line process, on the basis of the color information of the original image;

extracting a contour of an object image included in the original image on the basis of the generated discontinuity information, and separating the object image by using the extracted contour; and determining outline information in which the contour of the object image is outlined on the basis of the discontinuity information with respect to the separated object image, and encoding color information of the object image, wherein the contour of the original image is outlined by a parametric curve, and the color information is encoded by a parametric surface.

15. The image-component rendering method according to claim 14, further comprising the step of:

further separating the object image into element images making up the object image so as to render the object image into components.

* * * * *